(12) United States Patent
Xu et al.

(10) Patent No.: US 8,655,360 B2
(45) Date of Patent: Feb. 18, 2014

(54) METHOD AND SYSTEM OF ALLOCATING NETWORK TEMPORARY IDENTITIES

(71) Applicant: Huawei Technologies Co., Ltd., Shenzhen (CN)

(72) Inventors: Min Xu, Shenzhen (CN); Dong Chen, Shenzhen (CN); Zheng Zhou, Shenzhen (CN); Bin Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/649,880

(22) Filed: Oct. 11, 2012

(65) Prior Publication Data

US 2013/0040642 A1 Feb. 14, 2013

Related U.S. Application Data

(63) Continuation of application No. PCT/CN2011/072485, filed on Apr. 7, 2011.

(30) Foreign Application Priority Data

Apr. 13, 2010 (CN) .......................... 2010 1 0155157

(51) Int. Cl.
   *H04W 4/00* (2009.01)
(52) U.S. Cl.
   USPC ..................... 455/435.1; 455/435.2; 455/436; 455/438
(58) Field of Classification Search
   None
   See application file for complete search history.

(56) References Cited

U.S. PATENT DOCUMENTS

| 2004/0071126 | A1 | 4/2004 | Ramos-Escano |
| 2006/0025162 | A1* | 2/2006 | Cao et al. ...................... 455/466 |
| 2010/0041405 | A1* | 2/2010 | Gallagher et al. ............ 455/436 |
| 2010/0184421 | A1 | 7/2010 | Lindqvist |
| 2011/0021205 | A1 | 1/2011 | Horneman |

FOREIGN PATENT DOCUMENTS

| CN | 1689366 A | 10/2005 |
| CN | 1780481 A | 5/2006 |
| CN | 1852459 A | 10/2006 |
| CN | 1863384 A | 11/2006 |
| CN | 1867086 A | 11/2006 |
| CN | 101080094 A | 11/2007 |
| CN | 101090364 A | 12/2007 |
| CN | 101242553 A | 8/2008 |

(Continued)

OTHER PUBLICATIONS

International Search Report in corresponding International Patent Application No. PCT/CN2011/072485 (Jul. 14, 2011).

(Continued)

*Primary Examiner* — Suhail Khan
(74) *Attorney, Agent, or Firm* — Leydig, Voit & Mayer, Ltd.

(57) ABSTRACT

The present invention discloses a method and system for allocating Network Temporary Identities. The method comprises: obtaining capability information of a Home NodeB; allocating information for performing identity allocation to the Home NodeB, according to the capability information; sending the allocated information for performing identity allocation to the Home NodeB, so that the Home NodeB implements network temporary identity allocation according to the information for performing identity allocation; wherein the different information for performing identity allocation corresponds to different Home NodeBs to implement the network temporary identity allocation. The technical solution disclosed by the present invention can reduce the implementation complexity of Home NodeB Gateway and the time delay.

34 Claims, 7 Drawing Sheets

(56) References Cited

FOREIGN PATENT DOCUMENTS

| | | | |
|---|---|---|---|
| CN | 101483919 A | 7/2009 |
| CN | 101517984 A | 8/2009 |
| CN | 101547479 A | 9/2009 |
| CN | 101553014 A | 10/2009 |
| CN | 101572876 A | 11/2009 |
| CN | 101610579 A | 12/2009 |
| CN | 101754410 A | 6/2010 |
| CN | 101771942 A | 7/2010 |
| CN | 101998580 A | 3/2011 |
| CN | 101998611 A | 3/2011 |
| EP | 2056538 A1 | 5/2009 |
| EP | 2109324 A1 | 10/2009 |
| EP | 2259619 A1 | 12/2010 |
| WO | WO 2008108716 A1 | 9/2008 |
| WO | WO 2009118378 A1 | 10/2009 |
| WO | WO 2010/019970 A1 | 2/2010 |

OTHER PUBLICATIONS

Written Opinion of the International Searching Authority in corresponding International Patent Application No. PCT/CN2011/072485 (Jul. 14, 2011).

"R3-100082—U-RNTI Management Over the Iuh Interface," 3GPP TSG RAN WG3 Meeting #66bis, Jan. 22, 2010, 3GPP, Valbonne, France.

Extended European Search Report in corresponding European Patent Application No. 11768405.0 (Apr. 5, 2013).

"R3-082035—Some Identifiers Consideration for 3G HNB," 3GPP TSG RAN WG3 Meeting #61, Aug. 18-22, 2008, 3GPP, Valbonne, France.

"R3-090816—Managing of U-RNTI Over the Iuh Interface," 3GPP TSG-RAN WG3 Meeting #63bis, Mar. 23-26, 2009, Valbonne, France.

$1^{st}$ Office Action in corresponding Chinese Patent Application No. 201010155157.3 (Apr. 27, 2013).

* cited by examiner

METHOD AND SYSTEM OF ALLOCATING NETWORK TEMPORARY IDENTITIES

CROSS-REFERENCE TO RELATED APPLICATIONS

This application is a continuation of International Application No. PCT/CN2011/072485, filed on Apr. 7, 2011, which claims priority to Chinese Patent Application No. 201010155157.3, filed on Apr. 13, 2010, both of which are hereby incorporated by reference in their entireties.

FIELD OF TECHNOLOGY

The present invention relates communication technologies, and particularly, to a method and system of allocating Network Temporary Identities.

BACKGROUND OF THE INVENTION

In some communication systems, such as Global System for Mobile Communications (GSM), Wideband Code Division Multiple Access Wireless (WCDMA), Code Division Multiple Addressing (CDMA), Worldwide Interoperability for Microwave Access (WiMAX), CDMA2000, TD-SCDMA, Long Term Evolution (LTE), WLAN/WiFi and so on, in order to improve communication quality, a kind of home network technology is exploited.

As shown in FIG. 1, a schematic diagram illustrating a structure of a UMTS in the prior art is illustrated. Universal Mobile Telecommunication System (UMTS) adopting a similar structure as the second generation mobile telecommunication is a third generation mobile telecommunication system adopting WCDMA air interface technology. The UMTS is usually called WCDMA telecommunication system.

The UMTS system comprises a Radio Access Network (RAN) and a Core Network (CN). Here, the Radio Access Network is used to process all functions related with Radio, while the CN processes all voice calling and data connection in the UMTS system, and realizes exchange and rout functions with External Network. The CN is logically divided into a Circuit Switched Domain (CS) and a Packet Switched Domain (PS).

The Core Network (CN) comprises various network cells, such as a MSC/VLR, a Serving GPRS Support Node (SGSN), a HLR, a Gateway Mobile-services Switching Centre (GMSC), a Gateway GPRS Support Node (GGSN) and so on. The External Network can be connected through the GMSC or the GGSN. For example, a Public Land Mobile Network (PLMN), a Public Switched Telephone Network (PSTN), an Integrated Services Digital Network (ISDN) and so on can be connected through the GMSC, and Internet can be connected through the GGSN.

The interface between a User Equipment (UE) and a UTRAN is Uu. A NodeB and a Radio Network Controller (RNC) can be connected with each other through an Iub interface, and RNCs are connected with each other through an Iur interface. The interfaces between the UTRAN and the CN are all called Iu interface, which comprises an Iu-CS interface and an Iu-PS interface.

With the development of mobile communication technology, the demands of users present diversification. In order to satisfy the diversified demands of users, home coverage NodeB, corporation level inner coverage NodeB and other private networks emerge as the times require. For example, Home NodeB (HNB) that is also called femtocell base station, femtocell, or AP (Action Point) turns into the most potential low-cost access technology.

As shown in FIG. 2, a schematic diagram illustrating a structure of the Home NodeB system in the prior art is illustrated. The system comprises at least one Home NodeB, a HNB Management System (HMS) and a Home NodeB Gateway (HNB-GW). Here, the HNB provides the Uu interface to UEs, while the HNB and the HNB-GW are connected with each other through the Iuh interface, and the HNB-GW and the CN are connected with each other through the Iu interface (including the Iu-CS and the Iu-PS).

The HNB-GW is equivalent to the CN for the HNB, and is equivalent to the RNC for the CN. UEs are accessed to the network through the HNB and the HNB-GW. In this case, the HNB realizes the functions of the NodeB and that of the RNC, the HNB-GW provides a HNB authentication and a control plane convergence and other functions, while the HMS mainly provides HNB related data configuration and other functions.

As a Home NodeB, the HNB, compared to traditional macro NodeBs, has the following characteristics: small coverage area, limited amount of carried users, large amount, dense deployment, multi-layer overlapping coverage, devices controlled by HNB users other than operators, HNB frequency band that may be different frequency deployed with Legacy network, low transmit power. The HNB may configure adjacent cells automatically through uplink detection, while it is hard to configure adjacent cell list in the prior art.

The application scenes of HNB are quite widely, such as home, corporation, public areas, etc. Different scenes have different demands on the HNB. For example, for the home usage, the coverage area of the HNB is small hence the number of users is small, while for the corporation usage, compared to the home usage, the coverage area of the HNB is relatively lager, and the number of user is obviously increased since users of the corporation are more concentrated.

In the macro network, UTRAN Radio Network Temporary Identity (U-RNTI, UTRAN) is used for identifying UE uniquely, and consists of two parts:

U-RNTI(32 bit)=SRNC identity+S-RNTI.

Here, the SRNC identity is an identity of RNC, identifying one RNC uniquely in one Public Land Mobile Network (PLMN). While, the Serving-Radio Network Temporary Identifier (S-RNTI) is allocated by a Serving RNC (SRNC) and identifies one UE uniquely under one RNC. Generally speaking, the length of U-RNTI is 32 bits, the length of SRNC identity is 12 bits, and the length of S-RNTI is 20 bits. However, sometimes, an expansion is made to the SRNC identity whose length can reach to the maximum of 12 bits, while in this case, the length of the S-RNTI is 16 bits. In the UMTS macro network, the U-RNTI is allocated by a RNC entity to a UE with RRC connection. One new U-RNTI is allocated to the UE, when the UE sets up the RRC connection, or when the UE performs cell updating, or when the process of Serving Radio Network Subsystem (SUNS) relocation or other situation occurs.

However, for the HNB network, the RRC connection of UE terminates in the HNB. The HNB integrates functions of the NodeB and that of the RNC in the macro network, while the HNB-GW provides the function of control plane convergence. In the access network, the structure of the HNB network is evidently different from that of the macro network. In the HNB network, different methods of allocating U-RNTIs can be completed by any one or combination of the HNB and the HNB-GW. In this case, on the Iu interface of the HNB network, a RNC-ID is used for identifying HNB-GW uniquely in the Core Network, wherein the RNC-ID may be transferred to the HNB connected with the HNB-GW during a register process of the HNB. Therefore, when U-RNTI allocation is performed, the RNC-ID of HNB-GW may be used as the SRNC identity.

Therefore, in the HNB network, realizing of the U-RNTI may be as follows:

U-RNTI=RNC-ID+S-RNTI.

However, since multiple HNBs can be connected to one HNB-GW, uniqueness of S-RNTI needs to be guaranteed when U-RNTIs are allocated to these HNBs.

In the conventional art, the HNB and HNB-GW complete the allocation of U-RNTIs together, which mainly shows as follows:

After initialing a calling, a UE sets up Radio Resource Control (RRC) connection with a HNB, and the HNB allocates randomly, in the Radio Resource Control Connection Setup (RRC Connection Setup) message, one U-RNTI to the UE. The UE initiates initial direct transfer, and the HNB transfers the U-RNTI allocated randomly by the HNB to the HNB-GW through RANAP User Adaption (RUA) CONNECT message, namely that the RUA CONNECT message transferred to the HNB-GW carries the randomly-allocated U-RNTI. The HNB-GW checks the allocated U-RNTI. If there is no conflict, the HNB-GW stores the U-RNTI and performs the normal process continuously. If a conflict is found, the HNB-GW reallocates one U-RNTI without conflict to the HNB. The HNB reallocates the U-RNTI to the UE, and notices the HNB-GW that the reallocation process has been completed.

In the conventional art, the HNB-GW needs to manage allocation operation of each U-RNTI, and further needs to store each allocated U-RNTI. Simultaneously, the HNB-GW further needs to traverse each stored U-RNTI to check whether a conflict occurs after the HNB allocates one new U-RNTI each time, which increases the implementation complexity of the HNB-GW and brings some time delay.

SUMMARY OF THE INVENTION

The embodiments of the present invention provides a method of allocating Network Temporary Identities, Home NodeB Gateway, Home NodeB and system, which can reduce the implementation complexity of the Home NodeB Gateway and the time delay.

At one aspect of the present invention, a method of allocating Network Temporary Identities is disclosed, comprising: obtaining capability information of a Home NodeB; allocating information for performing identity allocation to the Home NodeB, according to the capability information; sending the allocated information for performing identity allocation to the Home NodeB, so that the Home NodeB implements network temporary identity allocation according to the information for performing identity allocation; wherein the different information for performing identity allocation corresponds to different Home NodeBs to implement the network temporary identity allocation.

At another aspect of the invention, a method of allocating Network Temporary Identities is disclosed, comprising: receiving, by a Home NodeB, information for performing identity allocation allocated according to capability information of the Home NodeB; implementing, by the Home NodeB, network temporary identity according to the information for performing identity allocation; wherein the different information for performing identity allocation corresponds to different Home NodeBs to implement the network temporary identity allocation.

At yet another aspect of the invention, a Home NodeB Gateway is disclosed, comprising: an obtaining unit for obtaining capability information of a Home NodeB; an allocating unit for allocating information for performing identity allocation to the Home NodeB according to the capability information; a sending unit for sending the allocated information for performing identity allocation to the Home NodeB, so that the Home NodeB implements network temporary identity allocation according to the information for performing identity allocation; wherein the different information for performing identity allocation corresponds to different Home NodeBs to implement the network temporary identity allocation.

At yet another aspect of the invention, a Home NodeB is disclosed, comprising: a reporting unit for reporting capability information of the Home NodeB to a Home NodeB Gateway or a Home NodeB management system; a transceiving unit for receiving information for performing identity allocation, which is allocated according to the capability information of the Home NodeB; an allocating unit for implementing network temporary identity according to the information for performing identity allocation; wherein the different information for performing identity allocation corresponds to different Home NodeBs to implement the network temporary identity allocation.

At yet another aspect of the invention, a communication system is disclosed, comprising: a Home NodeB Gateway or Home NodeB management system for obtaining capability information of a Home NodeB, allocating information for performing identity allocation to the Home NodeB according the capability information and sending the allocated information for performing identity allocation to the Home NodeB; a Home NodeB for implementing network temporary identity allocation according to the information for performing identity allocation; wherein the different information for performing identity allocation corresponds to different Home NodeBs to implement the network temporary identity allocation.

The technical solutions disclosed by the embodiments of the present invention can reduce the implementation complexity of Home NodeB Gateway and the time delay.

BRIEF DESCRIPTION OF THE DRAWINGS

To illustrate the technical solutions in the embodiments of the present invention or in the prior art more clearly, a brief introduction to the accompanying drawings which are needed in the description of the embodiments or the prior art is given below. Apparently, the accompanying drawings described below are some embodiments of the present invention, based on which other drawings can be obtained by the persons of ordinary skills in the art without any inventive efforts.

DETAILED DESCRIPTION OF THE EMBODIMENTS

In the following description, in order to illustrate other than to limit, specific details, such as specific system architecture, interface, technology and the like, are mentioned, so as to understand the present invention thoroughly. However, those skilled in the art should understand that the present invention can also be implemented in other embodiments without these details. In other cases, the detailed description of the well-known devices, circuits and methods are omitted to avoid unnecessary details to hinder the description of the present invention.

In the present application, "and/or", or "or/and" is a brief language expression manner, denoting three kinds of relationship. For example, "A and/or B" denotes that A is comprised alone, B is comprised alone, and A and B is comprised simultaneously.

The technical solutions of the present invention can be applied to various communication systems, for example, GSM, Code Division Multiple Access (CDMA, Code Division Multiple Access) system, TDS-CDMA, CDMA2000, WIMAX, Wideband Code Division Multiple Access (WirelessWCDMA, Wideband Code Division Multiple Access Wireless), General Packet Radio Service (GPRS, General Packet Radio Service), Long Term Evolution (LTE, Long Term Evolution), etc. The User Equipment (UE, User Equipment) may be Mobile Terminal or stationary terminal, etc.

Figure 1:
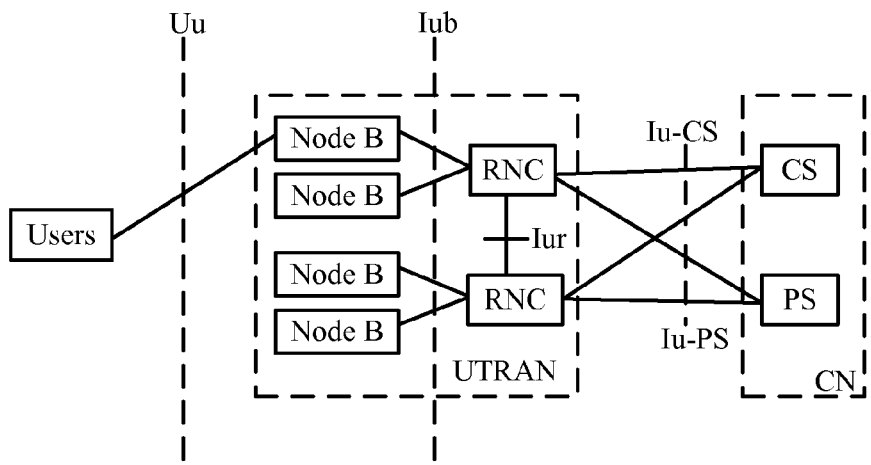
FIG. 1 is a schematic diagram illustrating a structure of a UMTS in the prior art.
Figure 2:
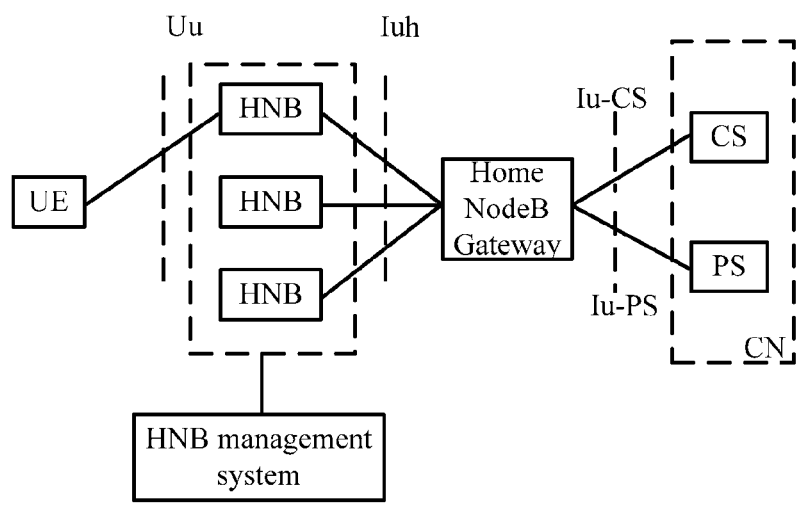
FIG. 2 is a schematic diagram illustrating a structure of a Home NodeB in the prior art.
Figure 3:
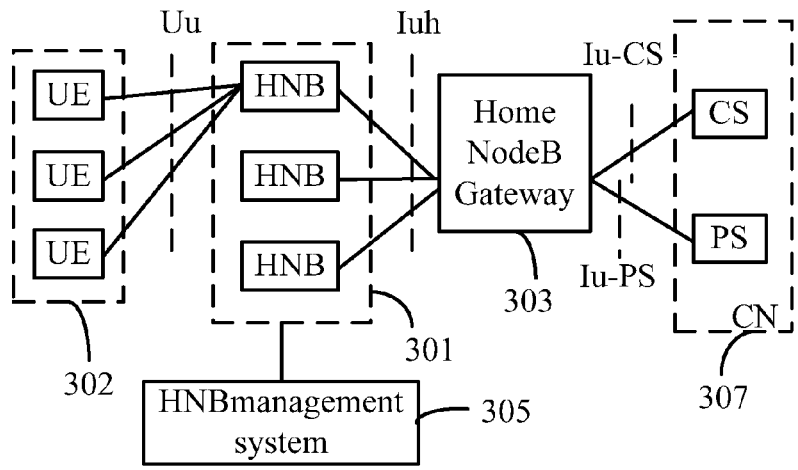
FIG. 3 is a schematic diagram illustrating a structure of a Home NodeB provided in an embodiment of the present invention.

As shown in FIG. 3, a schematic diagram illustrating a structure of a Home NodeB system provided in an embodiment of the present invention is illustrated. For example, taking the WCMDA system as an example, the Home NodeB system may comprise at least one Home NodeB (HNB) 301, Home NodeB Gateway (HNB-GW) 303 and HNB management system (HMS) 305, wherein the HNB 301 provides a Uu interface to at least one UE 302, while the HNB 301 and the HNB-GW 303 connects with each other through an Iuh interface, and the HNB-GW 303 and the CN 307 connects with each other through an Iu interface (comprising an Iu-CS, an Iu-PS).

The Home NodeB system shown in FIG. 3 only comprises one Home NodeB Gateway, three Home NodeBs (HNBs) and three User Equipments (UEs), but in practical, the present system may comprise any amount of Home NodeB Gateways, Home NodeBs and UEs, which is not limited by the present invention.

The HNB-GW 303 or the HNB management system (HMS) 305 is used for obtaining capability information of the Home NodeB (HNB) 301, allocating information for performing identity allocation to the Home NodeB according to the capability information and sending the allocated information for performing identity allocation to the Home NodeB, wherein the different information for performing identity allocation corresponds to different Home NodeBs to implement network temporary identity allocation.

For example, the information for performing identity allocation is prefix information for performing identity allocation, and the lengths of the prefix information for performing identity allocation are different when the capability information of Home NodeBs is different.

In another embodiment of the present invention, the information for performing identity allocation is one or multiple prefix information for performing identity allocation with fixed length. The prefix information for performing identity allocation with fixed length is Cell ID information.

The HNB-GW 303 or the HNB management system (HMS) 305 is used for obtaining the capability information of the Home NodeB (HNB) 301 and allocating prefix information for performing identity allocation with different lengths to the HNBs with different capabilities and sending the allocated prefix information for performing identity allocation to the HNB 301.

In another embodiment of the present invention, the HNB-GW 303 or the HNB management system (HMS) 305 is further used for sending the length information of the prefix information for performing identity allocation to the HNB 301.

For example, during a register process of the HNB, a configuration process of the HNB or a reconfiguration process of the HNB, the HNB 301 reports its capability information to the HNB-GW 303 or the HNB management system (HMS).

In another embodiment of the present invention, the HNB-GW 303 obtains the capability information of the Home NodeB 301 through the HNB management system (HMS, HNB Management System) 305 or a configuration method of an Operation and Maintenance (OAM, Operation and Maintenance).

In another embodiment of the present invention, the capability information of the Home NodeB 301 may be HNB type information, HNB usage scene information, the number of UEs needed to be supported by the HNB, or specific identity length needed by the HNB.

The Home NodeB 301 is used for implementing the Network Temporary Identity allocation according to the information for performing identity allocation.

For example, the Home NodeB 301 is used for allocating corresponding amount of bits to identify Use Equipments under the Home NodeB according to the prefix information for performing identity allocation and the information for identifying the HNB-GW.

For example, the Home NodeB 301 allocates corresponding amount of bits for the information for identifying User Equipments under the Home NodeB according to the relationship that the sum of bits occupied by the length information of the prefix information for performing identity allocation, the length information of the information for identifying HNB-GW and the information for identifying User Equipment under the Home NodeB is a predetermined value.

The HNB-GW 303 is further used for sending the information for identifying the HNB-GW to the HNB 301, for example, RNC-ID. The RNC-ID is used for identifying HNB-GWs in a same Core Network.

Figure 4:
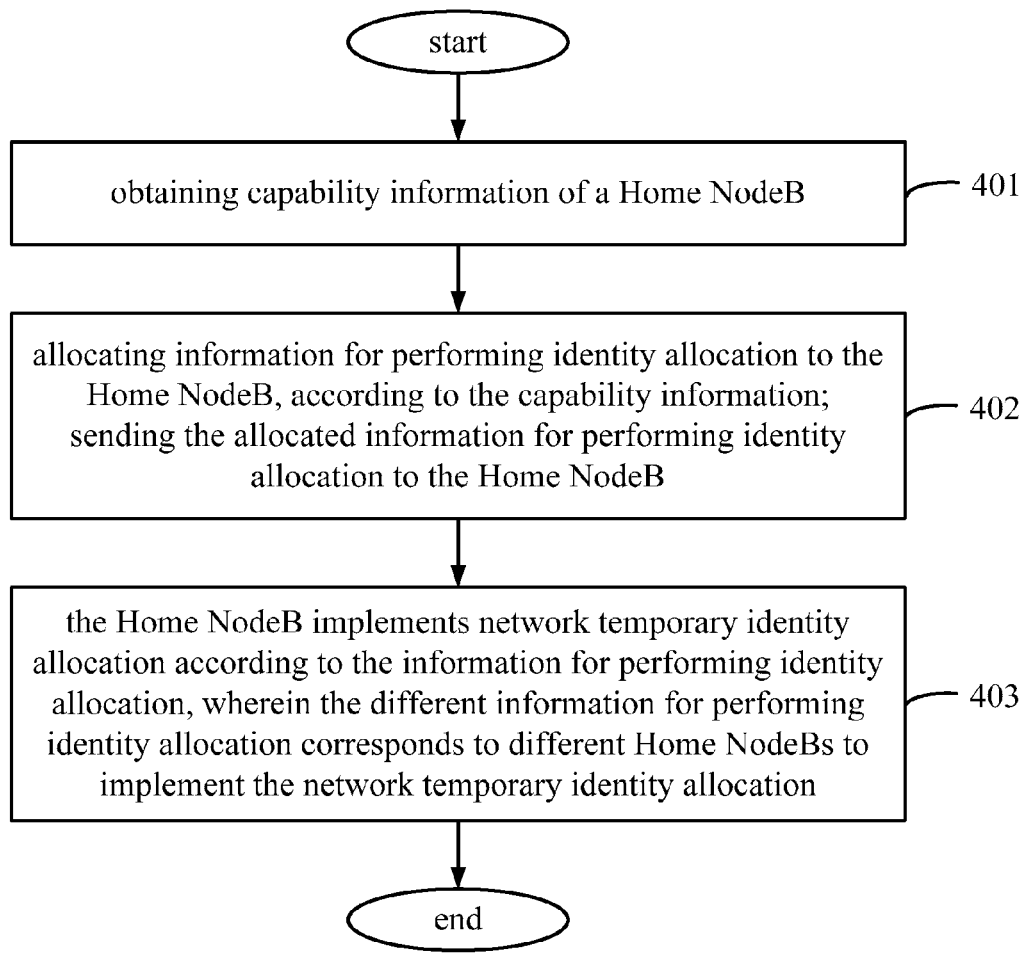
FIG. 4 is a schematic flowchart illustrating a method of allocating UTRAN Network Temporary identities provided in another embodiment of the present invention.

For the specific functions of the HNB 301 and that of the HNB-GW 303, please refer to the description of embodiments provided in FIG. 4.

The working process of the Home NodeB system may be illustrated by FIG. 4, which is a schematic flowchart illustrating a method of allocating Network Temporary Identities provided in another embodiment of the present invention. In the present embodiment, the Network Temporary Identity may be a UTRAN Radio Network Temporary Identity.

401, capability information of a Home NodeB is obtained.

For example, during a register process of the HNB, a configuration process of the HNB or a reconfiguration process of the HNB, the Home NodeB Gateway or the HNB management system (HMS) receives the capability information reported by the Home NodeB.

For example, during the register process of the HNB, the Home NodeB sends a register request to the Home NodeB Gateway or HNB management system (HMS), wherein the register request carries the capability information of the Home NodeB.

For example, during the configuration process of the HNB, the Home NodeB sends a configuration request to the Home NodeB Gateway or the HNB management system, wherein the configuration request carries the capability information of the Home NodeB.

For example, during the reconfiguration process of the HNB, the Home NodeB sends a reconfiguration request to the Home NodeB Gateway or the HNB management system (HMS), wherein the reconfiguration request carries the capability information of the Home NodeB.

In another embodiment of the present invention, the HNB-GW obtains the capability information of the Home NodeB by the HNB management system (HMS) or the configuration method of an Operation and Maintenance (OAM).

In another embodiment of the present invention, the capability information of the Home NodeB may be HNB type information, HNB usage scene information, the amount of UEs needed to be supported by the HNB, or specific identity length needed by the HNB.

402, information for performing identity allocation is allocated to the Home NodeB according to the capability information, and the allocated information for performing identity allocation is sent to the Home NodeB.

For example, it is described based on the following situation as an example, that the information for performing identity allocation is the prefix information for performing identity allocation, and the lengths of the prefix information for performing identity allocation are different when the capability information of the Home NodeBs is different.

The Home NodeB Gateway or the HNB management system (HMS) allocates prefix information for performing identity allocation with different lengths to the HNBs with different capabilities, and sends the allocated prefix information for performing identity allocation to the HNBs.

In another embodiment of the present invention, the Home NodeB Gateway or the HNB management system (HMS) further sends the length information of the allocated prefix information for performing identity allocation to the Home NodeB.

For example, the HNB-GW allocates prefix information for performing identity allocation with different lengths to various HNBs according to different capability information of the various HNBs, and the Home NodeB allocates corresponding amount of bits for the information for identifying User Equipments under the Home NodeB according to the prefix information for performing identity allocation and the information for identifying the HNB-GW. For example, the HNB allocates corresponding amount of bits for the information for identifying User Equipments under the Home NodeB, according to the relationship that the sum of bits occupied by the length information of the prefix information for performing identity allocation, and the length information of the information for identifying HNB-GW and the information for identifying User Equipments under Home NodeB is a predetermined value.

For example, the UTRAN Radio Network Temporary Identity comprises RNC-ID and S-RNTI, namely U-RNTI=RNC-ID+S-RNTI. While, in order to identify HNBs under a same HNB-GW and UEs under a same HNB, S-RNTIs need to be allocated. For example, the S-RNTI further comprises the prefix information for performing identity allocation (S-RNTI prefix) and Home NodeB Radio Network Temporary Identity (HNB-RNTI), namely that the relationship between the information lengths is that U-RNTI=RNC-ID+S-RNTI prefix+HNB-RNTI.

Here, the RNCI-ID is used for identifying a HNB-GW under a same Core Network, and the S-RNTI prefix is used for a Home NodeB to implement the network temporary identity allocation.

In another embodiment of the present invention, the HNB-GW determines the information length of the prefix information that needs to perform identity allocation according to the capability information reported by various HNBs, and then allocates the prefix information for performing identity allocation with different lengths, for example, Home NodeB indications (S-RNTI prefixes), to the various HNBs with different capabilities.

The HNB-GW further sends the information for identifying HNB-GW to the HNB, for example, RNC-ID, wherein the RNC-ID is used for identifying a HNB-GW under a same Core Network.

403, the Home NodeB implements the network temporary identity allocation according to the information for performing identity allocation, wherein the different information for performing identity allocation corresponds to different Home NodeBs to implement the network temporary identity allocation.

For example, taking the information for performing identity allocation being the prefix information for performing identity allocation as an example, since the lengths of S-RNTI prefixes used by HNBs with different capabilities under a same HNB-GW may be different, the lengths of HNB-RNTIs reserved for the HNBs to allocate are different.

For example, assuming that the length of the U-RNTI is a certain predetermined value (N bits), when the length of the allocated RNC-ID is a first value (n1 bits) and the length of the S-RNTI prefix allocated to the HNB by the HNB-GW according to the capability of the HNB is a second value (n2 bits), the HNB allocates, according to the information length relationship, namely, U-RNTI=RNC-ID+S-RNTI prefix+HNB-RNTI, the remaining bits to UEs thereunder to identify various UEs.

For example, assuming that the length of the U-RNTI is 32 bits, if the length of the RNC-ID is 12 bits and the capability information reported by the HNB is that one HNB only needs to support 16 UEs, then the length of the S-RNTI prefix allocated by the HNB-GW is 16 bits, namely that the maximum of 2^16=65536 HNBs may be supported under one HNB-GW, while the length of the HNB-RNTI allocated by the HNB is 4 bits, which can meet the requirement that the HNB needs to allocate the U-RNTIs of 2^4=16 UEs. If the capability information reported by the HNB-GW is that one HNB needs to support 64 UEs, the length of the S-RNTI prefix allocated by the HNB-GW is 14 bits, namely that the maximum of 2^14=16384 HNBs may be supported under one HNB-GW, while the length of the HNB-RNTI allocated by the HNB is 6 bits, which can meet the requirement that the HNB needs to allocate the U-RNTIs of 2^6=64 UEs.

In another embodiment of the present invention, the Home NodeB broadcasts the prefix information for performing identity allocation and/or the length information of the prefix information for performing identity allocation through a system message. The Home NodeB obtains the prefix information for performing identity allocation and/or the length information of the prefix information for performing identity allocation by reading a broadcast message of an adjacent HNB or by configuration.

In another embodiment of the present invention, the information for performing identity allocation is one or multiple prefix information for performing identity allocation with fixed length. The prefix information for performing identity allocation with fixed length is Cell Identity information.

During a register process of the HNB, a configuration process of the HNB or a reconfiguration process of the HNB, the Home NodeB reports the capability information or/and the number information of the cell identity information to the Home NodeB Gateway (HNB-GW) or the HNB management system (HMS).

For example, during the HNB initialing, or the HNB background configuring, or interacting with the HMS, or the HNB registering, or the HNB configuring, or the HNB reconfiguring, a capability interaction is performed, and the HMS or the HNB-GW allocates one or multiple Cell Identity information according to the capability information of the HNB.

Cell ID is comprised when the HNB allocates the U-RNTI. If the U-RNTI is of 23-bit, and if the Cell ID is of 28-bit, in the case that the Cell ID is comprised, 4 bits remains, which is allocated to identity users by the HNB, namely that there may be 2^4=16 connected users under each Cell ID.

The HNB notices the HMS the number of the connected users that may be supported thereby during the process of performing initiazition, and the HMS allocates, according to the capability of the HNB, the number of Cell IDs occupied by the HNB, wherein the allocation format of Cell ID is as follows.

The HNB-GW or the HMS allocates, according to the capability information of the HNB, one or multiple prefix information performing identity allocation with fixed length to the HNB. For example, the prefix information for performing identity allocation may be Cell identity (Cell ID) information.

For example, if the HNB may support maximum of 16 users in connected state, the HNB-GW or the HMS only needs to allocate one Cell ID to the HNB to use.

For example, if the HNB may support maximum of 16-32 users in connected state, the HNB-GW or the HMS only needs to allocate two consecutive Cell IDs to the HNB to use:
xxxx,xxxx,xxxx,xxxx,xxxx,xxxx,xx00;
xxxx,xxxx,xxxx,xxxx,xxxx,xxxx,xx01.

For example, if the HNB may support maximum of 32-48 users in connected state, the HNB-GW or the HMS only needs to allocate three consecutive Cell IDs to the HNB to use:
xxxx,xxxx,xxxx,xxxx,xxxx,xxxx,xx00;
xxxx,xxxx,xxxx,xxxx,xxxx,xxxx,xx01;
xxxx,xxxx,xxxx,xxxx,xxxx,xxxx,xx10.

For example, if the HNB may support maximum of 48-64 users in connected state, the HNB-GW or HMS only needs to allocate four consecutive Cell IDs to the HNB to use:
xxxx,xxxx,xxxx,xxxx,xxxx,xxxx,xx00;
xxxx,xxxx,xxxx,xxxx,xxxx,xxxx,xx01;
xxxx,xxxx,xxxx,xxxx,xxxx,xxxx,xx10;
xxxx,xxxx,xxxx,xxxx,xxxx,xxxx,xx11.

If the capability of the HNB is stronger, the rest may be deduced by analogy. One or multiple Cell ID may be allocated, and it may be defined that, among the Cell IDs allocated to the HNB to use, the first one is a primary Cell ID broadcasted to external, and other Cell IDs are visible for the HNBs, the HMS and the HNB-GW. For UEs, only the Cell ID broadcasted by the HNB is visible.

For example, the relationship between the information lengths is that U-RNTI=Cell ID+HNB-RNTI. The HNB-GW or the HMS may allocate multiple consecutive Cell IDs to the HNB according to the capability of the HNB, thus the number of U-RNTIs that can be allocated by the HNB is also increased.

For example, if the HNB needs to allocate the U-RNTIs (32 bits) to 16 UEs, only one Cell ID (28 bits) needs to be allocated to the HNB, and the remaining 4 bits are allocated by the HNB, namely 2^4=16.

If the U-RNTIs (32 bits) need to be allocated to 17-32 UEs, two Cell IDs (28 bits), namely, 0000, 0000, 0000, 0000, 0000, 0000, 0000 and 0000, 0000, 0000, 0000, 0000, 0000, 0001, need to be allocated to the HNB, and during the allocation, the number of the available U-RNTIs is totally 32, that is 0000, 0000, 0000, 0000, 0000, 0000, 0000,000~00000, 0000, 0000, 0000, 0000, 0000, 0000, 1111 and 0000, 0000, 0000, 0000, 0000, 0000, 0001,000~00000, 0000, 0000, 0000, 0000, 0000, 0001, 1111.

If the U-RNTIs (32 bits) need to be allocated to 33-48 UEs, three cell IDs (28 bits), namely, 0000, 0000, 0000, 0000, 0000, 0000, 0000 and 0000, 0000, 0000, 0000, 0000, 0000, 0001 and 0000, 0000, 0000, 0000, 0000, 0000, 0010, need to be allocated to the HNB, and 48 U-RNTIs are available.

The HNB broadcasts the first configured Cell ID in a system message, and the HNB needs to report the number of the allocated Cell ID information to the HNB-GW, during the register process or the configuration process or the reconfiguration process, when the configuration is performed by the HMS or by background, thus the HNB-GW may calculate what Cell iId information is configured to the HNB.

At this time, the number of the Cell Identity information occupied by the HNB needs to be further broadcasted in the system message.

In another embodiment of the present invention, the Home NodeB broadcasts the number information of the Cell Identity information by a system message. The Home NodeB obtains the number information of the Cell Identity information by reading the broadcast message of adjacent HNB or by configuration.

In another embodiment of the present invention, when the process of removing register or releasing configuration of the HNB occurs, the Home NodeB releases the prefix information for performing identity allocation. For example, the HNB-GW notices the HNB to release the allocated prefix information for performing identity allocation, or the HNB notices the HNB-GW to release the prefix information for performing identity allocation.

Therefore, during the process of communication, the U-RNTIs may be allocated dynamically according to the capability information reported by the HNBs. Thus the U-RNTIs may be allocated or used flexibly and reasonably according to different scenes, for example, home usage scene, corporation or marketplace and other different network deploying scenes. HNB-GW network deploying plan needs not to be re-performed, so as to save costs.

Furthermore, the HNB-GW needs not to manage the allocation operation of each U-RNTI, and needs not to traverse each stored U-RNTI to check whether a conflict is exist, which reduces the implementation complexity of the Home NodeB Gateway and the time delay brought by the allocation of U-RNTIs.

The following embodiment is described based on the following supposition which is taken as an example: the information for performing identity allocation is prefix information for performing identity allocation, and the lengths of prefix information for performing identity allocation are different when the capability information of Home NodeBs is different.

In an embodiment of the present invention, the Home NodeB Gateway (HNB-GW) or the HMS obtains the capability information of the Home NodeB (HNB), and the HNB may report its capability information to the HNB-GW or the HMS during the register process of the HNB, the configuration process of the HNB or the reconfiguration process of the HNB. The HNB-GW may otherwise obtain the capability information of the Home NodeB by the HMS or the Operation and Maintenance (OAM, Operation and Maintenance) and other configuration method. However, in order to describe conveniently, several cases are taken as an example.

Figure 5:
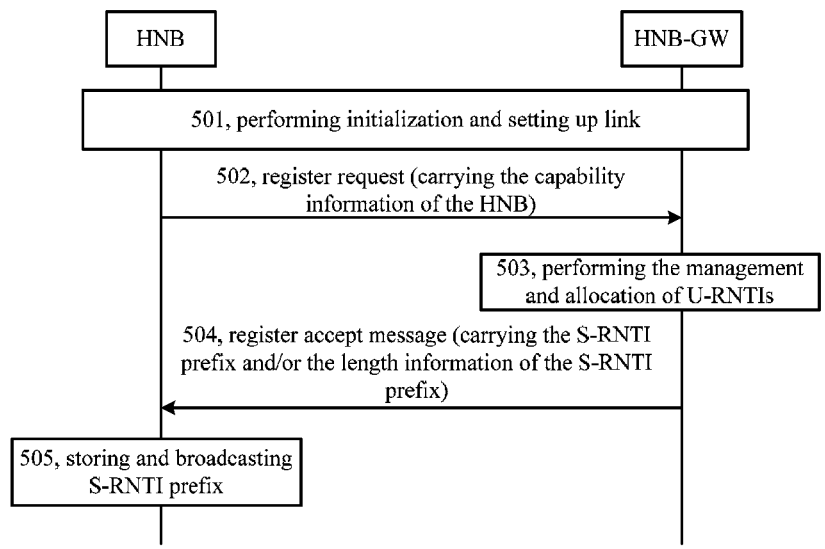
FIG. 5 is a schematic flowchart illustrating a method of allocating UTRAN Network Temporary identities provided in yet another embodiment of the present invention.

As shown in FIG. 5, the method of allocating UTRAN radio Network Temporary Identities is illustrated, which is described as follows.

501, the HNB performs initialization and sets up connection with the HNB-GW.

502, the HNB sends a register request to the HNB-GW, for example, HNB register request of Home NodeB application Part (HNBAP, Home NodeB Application Part, HNB Register Request), wherein the register request carries the capability information of the HNB.

For example, the register request carries a HNB type, a HNB capability, a HNB usage scene, or other information, or the number of the UEs needed to be supported by the HNB, or the specific identity length needed by the HNB.

503, the HNB-GW performs the management of U-RNTIs and allocates different S-RNTI prefixes to HNBs with different capabilities according to the capability information reported by the HNBs.

For the HNBs under a same HNB-GW, since the lengths of the S-RNTI prefixes used by the HNBs with different capabilities may be different, the lengths of the HNB-RNTIs reserved for the HNBs to allocate are different.

In the present embodiment, the process of the HNB-GW managing the U-RNTIs may be described as follows. The RNI-ID is used for identifying HNB-GWs under a same Core Network, thus the HNB-GW only needs to manage the allocation of the S-RNTIs. While, in the management of the S-RNTIs, the part of allocating S-RNTI prefixes only needs to be managed, thus the HNB-GW needs not to manage the allocation of each specific U-RNTI, which reduce the implementation complexity of the HNB-GW. In the present embodiment, the HNB-GW manages the allocation of U-RNTIs by adopting a tree structure.

Figure 6:
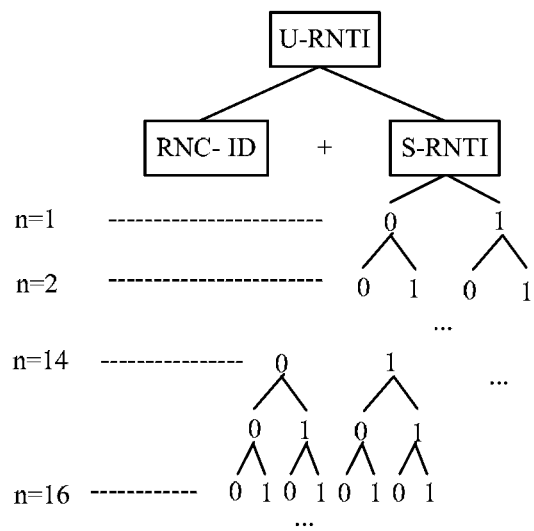
FIG. 6 is a schematic diagram illustrating a tree structure of HNB-GW managing U-RNTIs provided in yet another embodiment of the present invention.

As shown in FIG. 6, a schematic diagram illustrating a tree structure of HNB-GW managing U-RNTIs provided in another embodiment of the present invention is illustrated.

As shown in FIG. 6, n denotes the number of layers of the tree in the tree structure, which is used for denoting the length of S-RNTI prefix. If the length of the RNC-ID is r bits, (32-r-n) bits may be remained for the HNB to perform the allocation of U-RNTIs. As the example taken in the figure, assuming that the S-RNTI prefix of the first HNB is 0000 0000 0000 00 and n=14, the HNB-GW needs to manage the branches, (0000 0000 0000 00xx . . . ), deriving from itself, and the HNB-GW only may reallocate this branch and derived branches thereof, until that the first HNB and HNB-GW loss connection with each other caused by register removing of the first HNB or other reason and that the HNB-GW releases the S-RNTI prefix of the first HNB. When the HNB-GW needs to allocate S-RNTI prefix to the second HNB, the allocation needs to be started from another branch (0000 0000 0000 01 . . . ), for example, n=16, thus the S-RNTI prefix of the second HNB may be 0000 0000 000 0100. In the same way, the HNB-GW also needs not to maintain and allocate several branches below itself.

504, the HNB-GW sends a register accept message to the HNB, wherein the register accept message carries the S-RNTI prefix allocated to the HNB.

In another embodiment of the present invention, the register accept message further carries the length information of the S-RNTI prefix.

In another embodiment of the present invention, the register accept message may further carry the RNC-ID.

505, the HNB allocates corresponding amount of bits for identifying User Equipments under the HNB, according to the S-RNTI prefix and the RNC-ID.

The HNB stores the S-RNTI prefix and/or the length information of the S-RNTI prefix, and may broadcast these information.

The HNB may perform the U-RNTI allocation by combining the RNC-ID and S-RNTI information, and the HNB may allocate the remaining bits to different UEs. The specific description may be described as follows.

For example, the HNB allocates corresponding amount of bits for identifying User Equipments under the HNB according to the relationship between the information lengths, namely, U-RNTI=RNC-ID+S-RNTI prefix+HNB-RNTI.

Wherein the S-RNTI prefix is of variable length and is allocated by the HNB-GW, and the HNB-RNTI is of variable length and is allocated by the HNB.

For example, when the length of the U-RNTI is limited to 32 bits, if the length of the RNC-ID is 12 bits and if the capability information reported by the HNB is that one HNB only needs to support 16 UEs, the length of the S-RNTI prefix allocated by the HNB-GW is 16 bits, namely, the maximum of $2^{16}=65536$ HNBs may be supported under one HNB-GW, while the length of the HNB-RNTI is 4 bits, which can meet the requirement that the HNB needs to allocate the U-RNTIs of $2^4=16$ UEs. If the capability information reported by the HNB is that one HNB only needs to support 64 UEs, the length of the S-RNTI prefix allocated by the HNB-GW is 14 bits, namely, the maximum of $2^{14}=16384$ HNBs may be supported under one HNB-GW, while the length of the HNB-RNTI is 6 bits, which can meet the requirement that the HNB needs to allocate the U-RNTIs of $2^6=64$ UEs.

In another embodiment of the present invention, the Home NodeB broadcasts the S-RNTI prefix and/or the length information of the S-RNTI prefix by a system message. The Home NodeB obtains the S-RNTI prefix and/or the length information of the S-RNTI prefix by reading the broadcast message of the adjacent HNB or by configuration.

In another embodiment of the present invention, when the process of removing register or releasing configuration of the HNB occurs, the Home NodeB releases the prefix information for performing identity allocation. For example, the HNB-GW notices the HNB to release the allocated prefix information for performing identity allocation, or the HNB notices the HNB-GW to release the prefix information for performing identity allocation.

Therefore, during the process of communication, the U-RNTIs may be allocated dynamically according to the capability information reported by the HNBs. Thus the U-RNTIs may be allocated or used flexibly and reasonably according to different scenes, for example, home usage scene, corporation or marketplace and other different network deploying scenes. HNB-GW network deploying plan needs not to be re-performed, so as to save costs.

Furthermore, the HNB-GW needs not to manage the allocation operation of each U-RNTI, and needs not to traverse each stored U-RNTI to check whether a conflict is exist, which reduces the implementation complexity of the Home NodeB Gateway and the time delay brought by the allocation of U-RNTIs.

Figure 7:
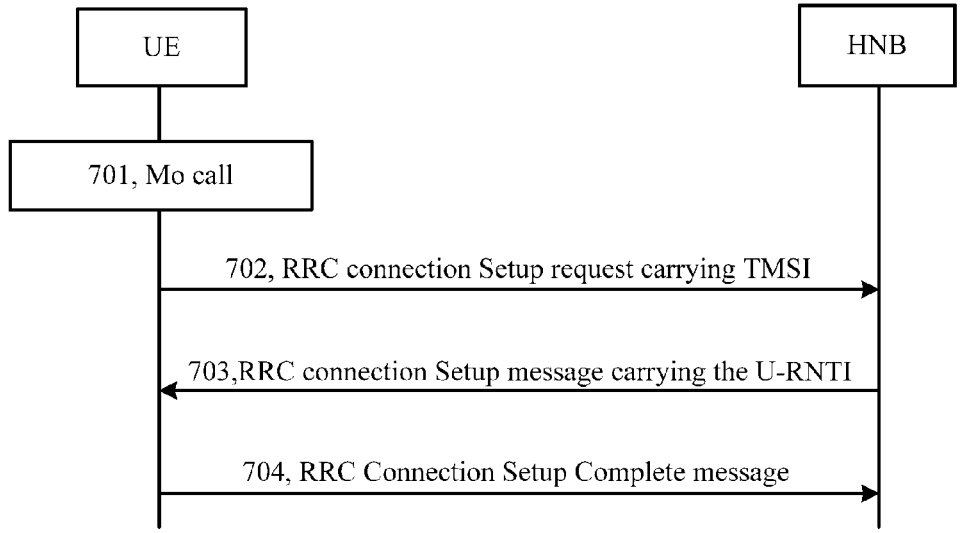
FIG. 7 is a schematic flowchart illustrating a method of allocating UTRAN Radio Network Temporary Identities provided in yet another embodiment of the present invention.

As shown in FIG. 7, a schematic diagram illustrating the method of allocating UTRAN Network Temporary Identities provided in another embodiment of the present invention is illustrated. The present embodiment describes UTRAN Radio Network temporary identity allocation in the process of UE setting up RRC connection.

701, a UE decides to initiate a calling (Mo call) in a HNB.

702, the UE sends a RRC connection Setup request (RRC Connection Request) to the HNB.

The RRC Connection Setup Request carries a temporary identity (TMSI, Temporary Mobile Subscriber Identity).

703, the HNB sends s RRC connection Setup (RRC Connection Setup message) message to the UE, wherein the RRC Connection Setup message carries the U-RNTI allocated to the UE by the HNB.

For example, the Home NodeB implements the allocation of UTRAN Radio Network Temporary identities, according to the information for identifying HNB-GW and the S-RNTI prefix.

For example, the HNB allocates, according to the capability information itself, the information for identifying HNB-GW after receiving the RRC Connection Setup Request, then allocates corresponding amount of bits for the information for identifying User Equipments under the Home NodeB, according to the relationship that the sum of bits occupied by the prefix information for performing identity allocation, the information for identifying HNB-GW, and the information for identifying User Equipments under the Home NodeB is a predetermined value.

For example, the relationship between the information lengths is that U-RNTI=RNC-ID+S-RNTI prefix+HNB-RNTI. The HNB allocates the U-RNTI to the UE according to the relationship.

After allocating the U-RNTI to the UE, the HNB transfers the U-RNTI to the UE through the RRC Connection Setup message.

704, after receiving the RRC Connection Setup message, the UE sends RRC Connection Setup Complete message. The entire process of RRC connection setup is finished.

Through the above description, it can be seen that the signaling overload and the time delay can be reduced when the U-RNTI is allocated to a certain UE.

Figure 8:
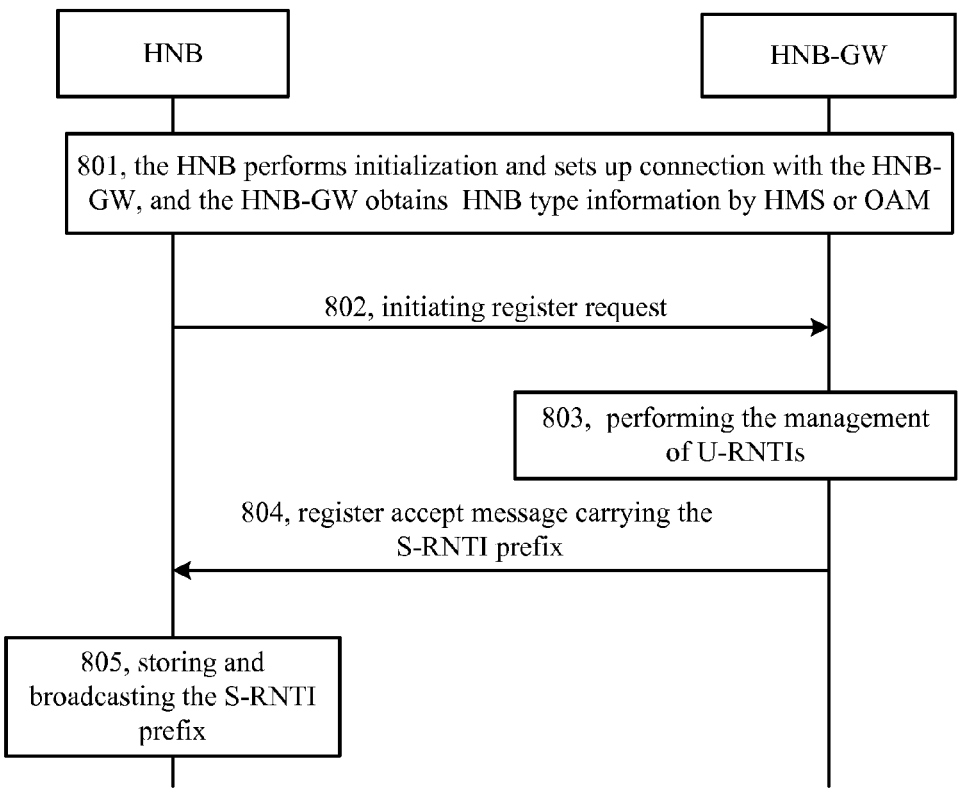
FIG. 8 is a schematic flowchart illustrating a method of allocating UTRAN Radio Network Temporary Identities provided in yet another embodiment of the present invention.

In another embodiment of the present invention, the HNB-GW obtains, by the HMS, the OAM or other configuration method, the capability information of the HNB, or the HNB type information, or the HNB usage scene information. As shown in FIG. 8, the schematic flowchart of allocating UTRAN Radio Network Temporary Identities provided in another embodiment of the present invention is illustrated.

801, the HNB performs initialization and sets up connection with the HNB-GW, and obtains the capability information of the HNB by the HMS, the OAM or other configuration method.

For example, the HNB performs the initialization and sets up the connection with the HNB-GW, and the HNB-GW obtains the HNB type, or the HNB capability information, or the HNB usage scene information by the HMS or OAM configuration method.

802, the HNB initiates a register request.

803, the HNB-GW performs the management and allocation of U-RNTIs.

For example, the HNB-GW performs the management of U-RNTIs and allocates different S-RNTI prefixes to HNBs with different capabilities, according to the obtained HNB capability information. For the specific allocation process, which is not described repeatedly, please refer to the processes of embodiments corresponding to FIG. 5 and FIG. 6.

804, the HNB obtains the S-RNTI prefix by a HNB register accept message.

The Home NodeB completes the allocation of UTRAN Radio Network temporary Identities, according to the information for identifying HNB-GW and the S-RNTI prefix.

For example, the Home NodeB allocates corresponding amount of bits for the information for identifying User Equipments under the Home NodeB, according to the relationship that the sum of bits occupied by the length information of the S-RNTI prefix, the length information of the information for identifying HNB-GW and the information for identifying User Equipments under the Home NodeB is a predetermined value.

In another embodiment of the present invention, the register accept message further carries the length information of the S-RNTI prefix.

In another embodiment of the present invention, the register accept message further carries the RNC-ID.

805, the HNB stores the S-RNTI prefix and/or its length information, and may broadcast these information.

For the method of managing the HNB-GW and allocating the U-RNTIs, and the process of the HNB allocating the information for identifying User Equipments under the Home NodeB to the UE, which are not described repeatedly, please refer to the processes of embodiments corresponding to FIG. 5 and FIG. 6.

In another embodiment of the present invention, the S-RNTI prefix with variable length used during the process of allocating U-RNTIs and the length thereof may be further noticed to the HNB, the HNB-GW and the adjacent HNBs by the method of background configuration.

In another embodiment of the present invention, the HNB obtains the S-RNTI prefix and/or the length information, and may broadcast the information in a broadcast message. Since the HNB has a function of downlink detection, the HNB may read the information of adjacent cells and implement configuration of related adjacent cells, namely that the adjacent HNB may read and store the S-RNTI prefix and/or the length information of the S-RNTI prefix, or obtain the S-RNTI prefix and/or the length information of the S-RNTI prefix through the background configuration. Therefore, the target HNB may find directly the source HNB according to the U-RNTI when the direct interface between the HNBs is introduced.

Figure 9:
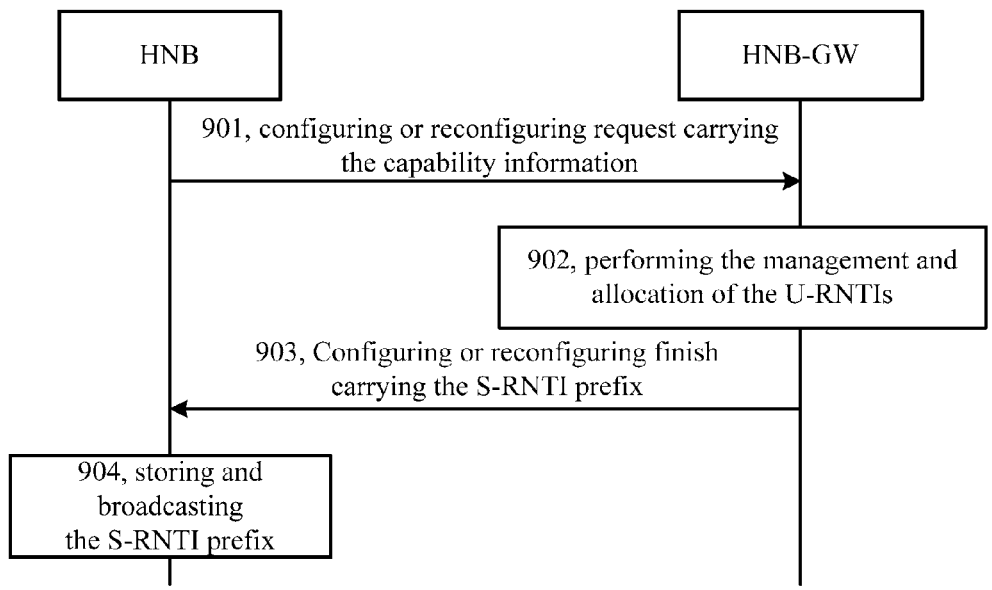
FIG. 9 is a schematic flowchart illustrating a method of allocating UTRAN Radio Network Temporary Identities provided in yet another embodiment of the present invention.

As shown in FIG. 9, a schematic flowchart illustrating the method of allocating U-TRAN Radio Network Temporary Identities is illustrated. The present embodiment describes the allocation of UTRAN Radio Network Temporary Identities during the process of configuration or reconfiguration.

901, the HNB sends a configuration or reconfiguration request to the HNB-GW, wherein the configuration or reconfiguration request carries the capability information of the HNB.

For example, the capability information of the Home NodeB may be HNB type information, HNB usage scene information, the number of UEs needed to be supported by the HNB, or specific identity length needed by the HNB.

902, the HNB-GW performs the management and allocation of U-RNTIs.

For example, the HNB-GW allocates the prefix information (for example, S-RNTI prefix) for performing identity allocation with different lengths to HNBs with different capabilities after receiving the capability information of the HNBs, wherein different information for performing identity allocation corresponds to different Home NodeBs to implement the allocation of UTRAN Radio Network Temporary Identities.

903, the HNB-GW sends a configuration or reconfiguration finish message carrying the S-RNTI prefix to the HNB.

The HNB-GW further sends the information for identifying HNB-GW to the HNB, for example, RNC-ID which is used for identifying HNB-GWs under a same Core Network.

904, the HNB stores and broadcasts the S-RNTI prefix.

The Home NodeB allocates corresponding amount of bits for the information for identifying User Equipments under the Home NodeB, according to the prefix information for performing identity allocation and the information for identifying HNB-GW. For example, the Home NodeB allocates corresponding amount of bits for the information for identifying User Equipments under the Home NodeB according to the relationship that the sum of bits occupied by the length information of the prefix information for performing identity allocation, the length information of the information for identifying HNB-GW and the information for identifying User Equipments under the Home NodeB is a predetermined value.

In another embodiment of the present invention, the Home NodeB broadcasts the prefix information for performing identity allocation and/or the length information of the prefix information for performing identity allocation through a system message. The Home NodeB obtains the prefix information for performing identity allocation and/or the length information of the prefix information for performing identity allocation, by reading a broadcast message of an adjacent HNB or by configuration.

In another embodiment of the present invention, when the process of removing register or releasing configuration of the HNB occurs, the Home NodeB releases the prefix information for performing identity allocation. For example, the HNB-GW notices the HNB to release the allocated prefix information for performing identity allocation or the HNB notices the HNB-GW to release the prefix information for performing identity allocation.

Figure 10:
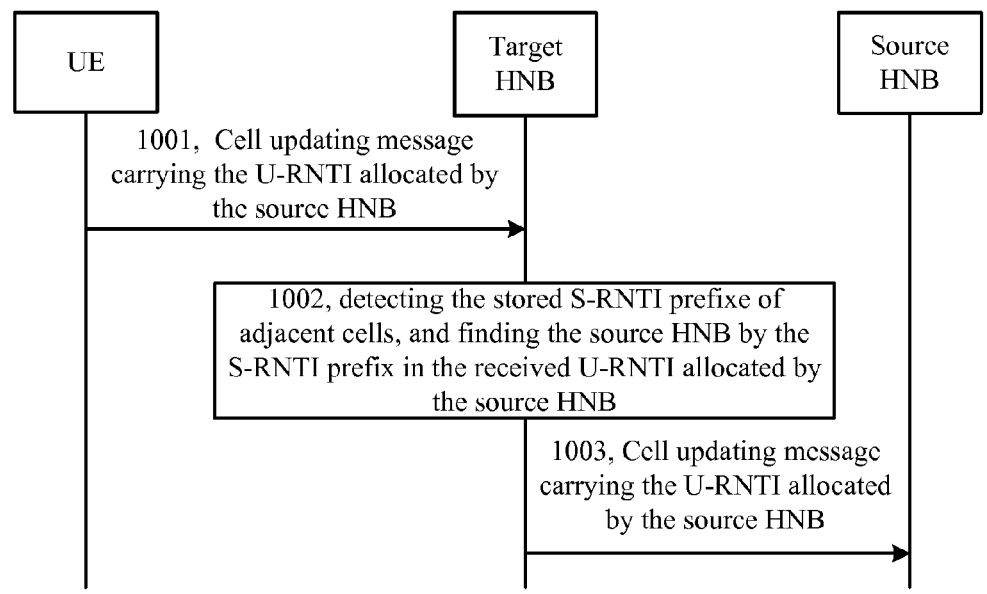
FIG. 10 is a schematic flowchart illustrating a method of obtaining U-RNTI during the process of cell updating provided in yet another embodiment of the present invention.

As shown FIG. 10, a schematic flowchart illustrating the method of determining source HNB by obtaining U-RNTI during the process of UE cell updating is illustrated. When the UE in NON-CELL_DCH state moves from source Home NodeB (source HNB) to targetHome NodeB (target HNB), the process of cell updating is initiated.

1001, the UE initiates the process of cell updating, and sends a Cell updating message to the target Home NodeB, wherein the Cell updating message carries the U-RNTI allocated by the source HNB.

1002, the target Home NodeB detects the stored S-RNTI prefixes of adjacent cells, and finds the source HNB by the S-RNTI in the received U-RNTI allocated by the source HNB.

The target HNB receives the Cell updating message and obtains the U-RNTI of the source HNB therein, then finds that the U-RNTI is not allocated by the present cell.

Since the two HNBs are both connected to the same HNB-GW, the RNC-IDs corresponding to the two HNBs are same. Therefore, when the target HNB finds that the RNC-ID carried by the U-RNTI is same with the RNC-ID of the HNB-GW connected therewith, it may be determined that the target cell is also managed simultaneously by the same adjacently-connected HNB-GW.

The target Home NodeB detects the stored prefix information for the adjacent cells to perform identity allocation, and finds the source HNB by the prefix information for performing identity allocation in the received U-RNTI allocated by the source HNB.

For example, the target HNB may compare the S-RNTI prefix in the U-RNTI allocated by the source HNB with the stored S-RNTI prefix information of adjacent cells. For example, the matching is performed from the highest bit. When one matched S-RNTI prefix information is found, the HNB may find the source HNB by this information.

1003, the target HNB sends a Cell updating message to the source HNB.

For example, the target HNB sends the Cell updating message to the source HNB by the interface between the target HNB and the source HNB, wherein the Cell updating message carries the U-RNTI allocated by the source HNB.

According to the above process, it can be seen that the target HNB may be found by the target HNB, through the interface between the HNBs, the U-RNTI allocated by the source HNB during the process of cell updating, which needs not the assistance and forwarding of the HNB-WG, thus the load of processing signaling in the HNB is decreased, and the time delay is reduced.

Figure 11:
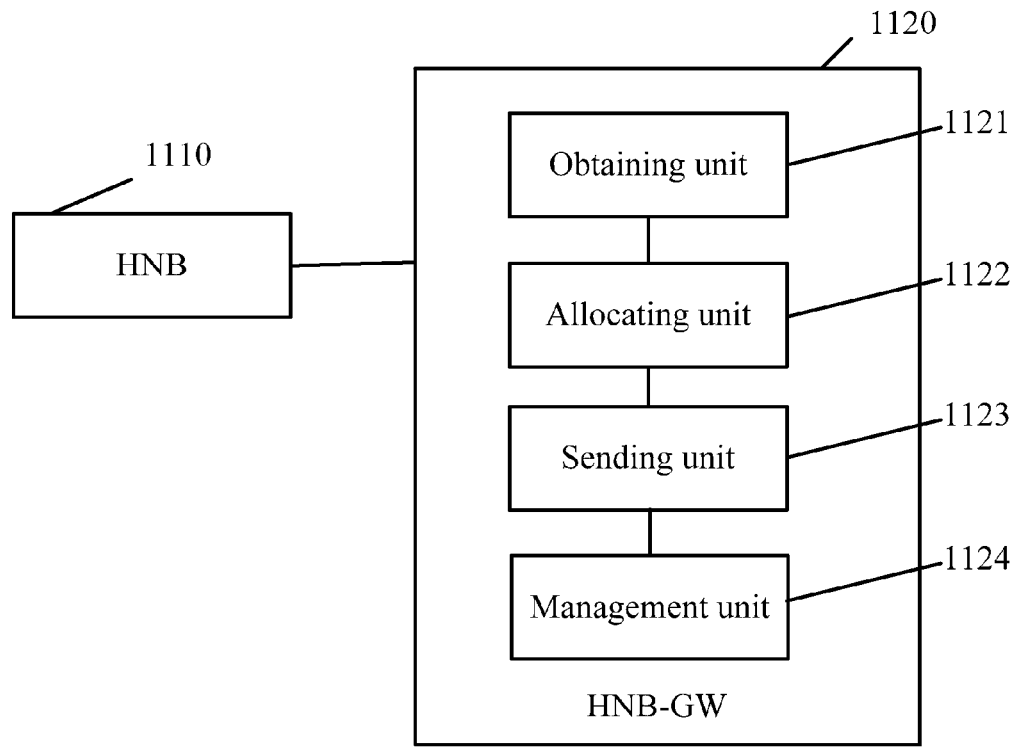
FIG. 11 is schematic diagram illustrating a structure of the system of allocating UTRAN Radio Network Temporary Identities provided in yet another embodiment of the present invention.

A system of allocating UTRAN Radio Network Temporary identities is further disclosed in another embodiment of the present invention. As shown in FIG. 11, a schematic diagram illustrating a structure of the system of allocating UTRAN Radio Network Temporary Identities provided in another embodiment of the present invention is illustrated.

As shown in FIG. 11, the system of allocating UTRAN Radio Network Temporary Identities may comprise a Home NodeB 1110 and a Home NodeB Gateway 1120, wherein the Home NodeB 1110 and the Home NodeB Gateway 1120 connects with each other, for example, by optical fiber.

The Home NodeB 1120 further comprises an obtaining unit 1121, an allocating unit 1122, a sending unit 1123 and a management unit 1124.

The obtaining unit 1121 is used for obtaining capability information of the Home NodeB 1110.

For example, during a register process of the HNB, a configuration process of the HNB or a reconfiguration process of the HNB, the obtaining unit 1121 receives the capability information reported by the HNB 1110.

In another embodiment of the present invention, the obtaining unit 1121 obtains the capability information of the Home NodeB by a HNB management system or an Operation and Maintenance configuration method.

In another embodiment of the present invention, the capability information of the Home NodeB may be HNB type information, HNB usage scene information, the number of UEs needed to be supported by the HNB, or specific identity length needed by the HNB.

The allocating unit 1122 is used for allocating information for performing identity allocation to the Home NodeB according to the capability information.

For example, the allocating unit 1122 is used for allocating prefix information for performing identity allocation with different lengths to Home NodeBs with different capabilities.

For example, the allocating unit 1122 is used for allocating one or multiple prefix information for performing identity allocation with fixed length to the Home NodeB according to the capability information.

The sending unit 1123 is used for sending the allocated information for performing identity allocation to the Home NodeB, so that the Home NodeB implements network temporary identity allocation. Wherein, the different information for performing identity allocation corresponds to different Home NodeBs to implement the network temporary identity allocation.

For example, the sending unit 1123 is used for sending the allocated prefix information for performing identity allocation to HNBs (for example, HNB 1110), so that the Home NodeBs implement the UTRAN Radio Network Temporary Identity allocation according to the information for identifying HNB-GW and the prefix information for performing identity allocation, wherein the different information for performing identity allocation corresponds to different Home NodeBs to implement the UTRAN Radio Network Temporary Identity allocation.

The management unit 1124 is used for managing the allocation of U-RNTIs by adopting tree structure, according to the capability information reported by the HNB. For the specific management and allocation process which is not described repeatedly here, please refer to the contents described in the embodiment of FIG. 6.

For example, the allocating unit 1122 is used for allocating the prefix information for performing identity allocation with different lengths to various HNBs according to different capability information of the various HNBs. In another embodiment of the present invention, the Home NodeB Gateway 1120 may further comprise a determining unit (not illustrated in the figure). The determining unit determines lengths of the information for performing identity allocation of various HNBs according to different capability information of the various HNBs, then the allocating unit 1122 allocates the prefix information for performing identity allocation with different lengths to the various HNBs.

The Home NodeB 1110 is used for implementing the UTRAN Radio Network Temporary Identity allocation, according to the prefix information for performing identity allocation and the information for identifying HNB-GW. For example, the Home NodeB 1110 is used for allocating corresponding amount of bits for the information for identifying User Equipments under the Home NodeB, according to the relationship that the sum of bits occupied by the length information of the prefix information for performing identity allocation, the length information of the information for identifying HNB-GW, the information for identifying User Equipments under the Home NodeB is a predetermined value.

For example, the relationship between the information lengths of the UTRAN Radio Network Temporary Identities is that U-RNTI=RNC-ID+S-RNTI prefix+HNB-RNTI.

Here, the RNC-ID is used for identifying HNB-GWs under a same Core Network, the S-RNTI prefix is used for identifying HNB under a same HNB-GW, and the HNB-RNTI is used for identifying UEs under a same HNB.

The sending unit 1123 is further used for sending the length information of the prefix information for performing identity allocation to the Home NodeB 1110.

The sending unit 1123 is further used for sending the information for identifying HNB-GW to the HNB 1110, for example, RNC-ID for identifying HNB-GWs under a same Core Network.

Since the lengths of S-RNTI prefixes used by HNBs with different capabilities under a same HNB-GW 1120 may be different, the lengths of HNB-RNTIs reserved for the HNB 1110 to allocate are also different.

For example, when the length of the U-RNTI is a certain predetermined value (N bits), and when the length of the allocated RNC-ID is a first value (n1 bits) and the length of the S-RNTI prefix allocated to the HNB 1110 by the allocating unit 1122 according to the capability of the HNB 1110 is a second value (n2 bits), the HNB 1110 allocates the remaining bits to the UEs under itself to identifying various UEs according to the relationship of information lengths, namely, U-RNTI=RNC-ID+S-RNTI prefix+HNB-RNTI.

For example, when the length of the U-RNTI is limited to 32 bits, if the length of the RNC-ID is 12 bits and if the capability information reported by the HNB 1110 is that one HNB only needs to support 16 UEs, then the length of the S-RNTI prefix allocated by the allocating unit 1122 is 16 bits, namely that the maximum of $2^{16}$=65536 HNBs may be supported under one HNB-GW 1120, while the length of the HNB-RNTI allocated by the HNB 1110 is 4 bits, which can meet the requirement that the HNB needs to allocate the U-RNTIs of $2^4$=16 UEs. If the capability information reported by the HNB 1110 is that one HNB needs to support 64 UEs, the length of the S-RNTI prefix allocated by the allocating unit 1122 is 14 bits, namely that the maximum of $2^{14}$=16384 HNBs may be supported under one HNB-GW 1120, while the length of the HNB-RNTI allocated by the Home NodeB 1110 is 6 bits, which can meet the requirement that the HNB needs to allocate the U-RNTIs of $2^6$=64 UEs.

In another embodiment of the present invention, the HNB-GW 1120 further comprises a releasing unit (not illustrated in the figures) for releasing the prefix information for performing identity allocation.

Therefore, during the process of communication, the U-RNTIs may be allocated dynamically according to the capability information reported by the HNBs. Thus the U-RNTIs may be allocated or used flexibly and reasonably according to different scenes, for example, home usage scene, corporation or marketplace and other different network deploying scenes. HNB-GW network deploying plan needs not to be re-performed, so as to save costs.

Furthermore, the HNB-GW needs not to manage the allocation operation of each U-RNTI, and needs not to traverse each stored U-RNTI to check whether a conflict is exist, which reduces the implementation complexity of the Home NodeB Gateway and the time delay brought by the allocation of U-RNTIs.

Figure 12:
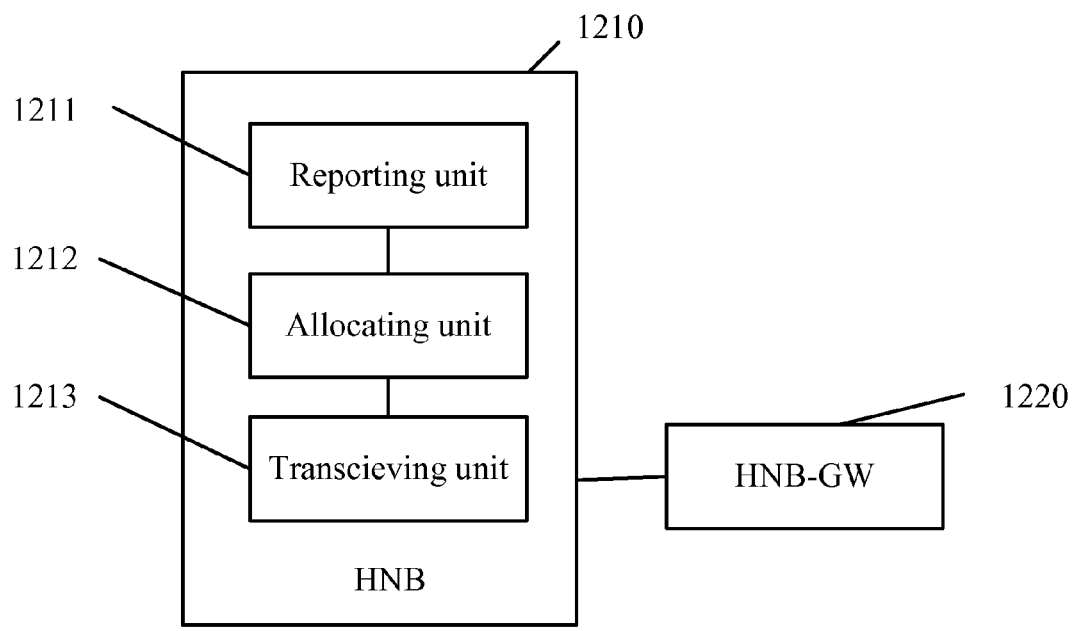
FIG. 12 is schematic diagram illustrating a structure of the system of allocating UTRAN Radio Network Temporary Identities provided in yet another embodiment of the present invention.

A system of allocating UTRAN Radio Network Temporary Identities is further disclosed in another embodiment of the present invention. As shown in FIG. 12, a schematic diagram illustrated a structure of the system of allocating UTRAN Radio Network Temporary Identities provided in another embodiment of the present invention is illustrated.

As shown in FIG. 12, the system of allocating UTRAN Radio Network Temporary Identities may comprise a Home NodeB 1210, and a Home NodeB Gateway 1220, wherein the Home NodeB 1210 and the Home NodeB Gateway 1120 connects with each other, for example, by optical fiber.

The Home NodeB 1210 further comprises a reporting unit 1211, an allocating unit 1212, a transceiving unit 1212 and a releasing unit 1214.

The reporting unit 1211 is used for reporting capability information of the Home NodeB to Home NodeB Gateway (HNB-GW) or HNB management system (HMS).

For example, during a register process of the HNB, a configuration process of the HNB or a reconfiguration process of the HNB, the reporting unit 1211 reports the capability information of Home NodeB 1210 to the Home NodeB Gateway 1220.

In another embodiment of the present invention, the capability information of the Home NodeB may be HNB type information, HNB usage scene information, the number of UEs needed to be supported by the HNB, or specific identity length needed by the HNB.

The Home NodeB Gateway 1220 is used for allocating prefix information for performing identity allocation with different lengths to HNBs with different capabilities, and sending the allocated prefix information for performing identity allocation to the HNBs (for example, HNB 1210).

In another embodiment of the present invention, the Home NodeB Gateway 1220 is further used for sending the length information of the prefix information for performing identity allocation to the HNBs (for example, HNB1210).

The transceiving unit 1213 is used for receiving the information for performing identity allocation allocated according to the capability information of the Home NodeB.

For example, the transceiving unit 1213 is used for receiving the prefix information for performing identity allocation allocated by the Home NodeB Gateway 1220 according to the capability information of Home NodeB.

In another embodiment of the present invention, the transceiving unit 1213 is further used for receiving the length information of the prefix information for performing identity allocation sent by the Home NodeB Gateway 1220.

The allocating unit 1212 is used for implementing the allocation of Network Temporary Identities according to the information for performing identity allocation. Here, different information for performing identity allocation corresponds to different Home NodeBs to implement the network temporary identity allocation.

For example, the allocating unit 1212 is used for implementing the allocation of UTRAN Radio Network Temporary Identities according to the information for identifying HNB-GW and the prefix information for performing identity allocation. Here, when the capability information is different, the lengths of corresponding prefix information for performing identity allocation are different. And the different information for performing identity allocation corresponds to different Home NodeBs to implement the network temporary identity allocation.

For example, the information for performing identity allocation is prefix information for performing identity allocation, and the lengths of prefix information for performing identity allocation are different when the capability information of Home NodeBs is different.

For example, the information for performing identity allocation is one or multiple prefix information with fixed length for performing identity allocation.

For example, the allocating unit 1212 is used for allocating corresponding amount of bits for the information for identifying User Equipments under the Home NodeB, according to the relationship that the sum of bits occupied by the length information of the prefix information for performing identity allocation, the length information of the information for identifying HNB-GW, and the information for identifying User Equipments under the Home NodeB is a predetermined value.

In another embodiment of the present invention, the transceiving unit 1213 is further used for sending the information for identifying User Equipments under Home NodeB to UEs.

In another embodiment of the present invention, the transceiving unit 1213 is further used for sending the prefix information for performing identity allocation and/or the length information of the prefix information for performing identity allocation by a broadcast message.

The releasing unit 1214 is used for releasing the prefix information for performing identity allocation.

For example, the relationship between the information lengths of UTRAN Radio Network Temporary Identities is that U-RNTI=RNC-ID+S-RNTI prefix+HNB-RNTI.

Here, the RNC-ID is used for identifying HNB-GWs under a same Core Network, the S-RNTI prefix is used for identifying HNBs under a same HNB-GW, and the HNB-RNTI is used for identifying UEs under a same HNB.

The transceiving unit 1213 is further used for receiving the information for identifying HNB-GW sent by the Home NodeB 1220, for example, RNC-ID for identifying HNB-GWs under a same Core Network.

Since the lengths of S-RNTI prefixes used by the HNBs with different capabilities under a same HNB-GW 1220 may be different, the lengths of HNB-RNTIs reserved for the HNB 1110 to allocate are also different.

For example, when the length of the U-RNTI is a certain predetermined value (N bits), and when the length of the allocated RNC-ID is a first value (n1 bits) and the length of the S-RNTI prefix allocated to the HNB 1210 by the Home NodeB Gateway 1220 according to the capability of HNB 1210 is a second value (n2 bits), the allocating unit 1212 allocates the remaining bits to the UEs under itself to identifying various UEs according to the relationship between the information lengths, namely, U-RNTI=RNC-ID+S-RNTI prefix+HNB-RNTI.

For example, when the length of the U-RNTI is 32 bits, if the length of the RNC-ID is 12 bits and if the capability information reported by the reporting unit 1211 is that the HNB 1210 only needs to support 16 UEs, then the length of the S-RNTI prefix allocated by the Home NodeB GW 1220 is 16 bits, namely that the maximum of 216=65536 HNBs may be supported under one HNB-GW 1220, while the length of the HNB-RNTI allocated by the allocating unit 1212 is 4 bits, which can meet the requirement that the HNB needs to allocate the U-RNTIs of 24=16 UEs. If the capability information reported by the reporting unit 1211 is that the HNB 1210 needs to support 64 UEs, the length of the S-RNTI prefix allocated by the Home NodeB-Gateway 1220 is 14 bits, namely that the maximum of 214=16384 HNBs may be supported under one HNB-GW 1220, while the length of the HNB-RNTI allocated by the allocating unit 1212 is 6 bits, which can meet the requirement that the HNB needs to allocate the U-RNTIs of 26=64 UEs.

Therefore, during the process of communication, the U-RNTIs may be allocated dynamically according to the capability information reported by the HNBs. Thus the U-RNTIs may be allocated or used flexibly and reasonably according to different scenes, for example, home usage scene, corporation or marketplace and other different network deploying scenes. HNB-GW network deploying plan needs not to be re-performed, so as to save costs.

Furthermore, the HNB-GW needs not to manage the allocation operation of each U-RNTI, and needs not to traverse each stored U-RNTI to check whether a conflict is exist, which reduces the implementation complexity of the Home NodeB Gateway and the time delay brought by the allocation of U-RNTIs.

Figure 13:
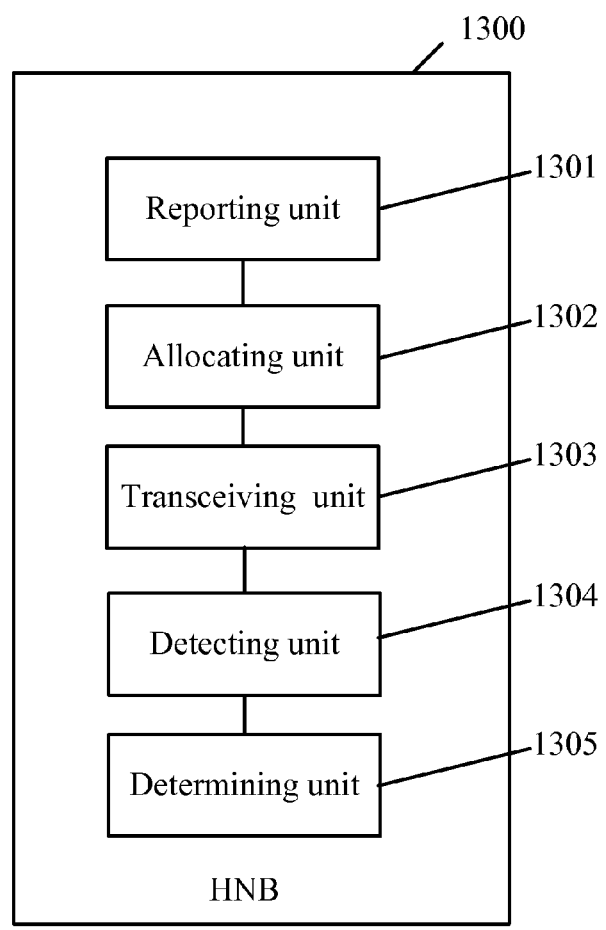
FIG. 13 is a schematic diagram illustrating a structure of a Home NodeB provided in yet another embodiment of the present invention.

As shown in FIG. 13, a schematic diagram illustrating a structure of a Home NodeB provided in another embodiment of the present invention is illustrated. The Home NodeB 1300 comprises a reporting unit 1301, an allocating unit 1302, a transceiving unit 1303, a detecting unit 1304 and a determining unit 1305.

The reporting unit 1301 is used for reporting capability information of a Home NodeB to a Home NodeB Gateway (HNB-GW) or a HNB management system (HMS).

The transceiving unit 1303 is used for receiving the information for performing identity allocation, which is allocated according to the capability information of the Home NodeB.

For example, the transceiving unit 1303 is used for receiving the prefix information for performing identity allocation allocated and sent by the Home NodeB Gateway, wherein the lengths of corresponding prefix information for performing identity allocation are different when the capability information is different, and the different prefix information for performing identity allocation corresponds to different Home NodeBs to implement the network temporary identity allocation.

For example, the transceiving unit 1303 is used for receiving one or multiple prefix information for performing identity allocation with fixed length.

In another embodiment of the present invention, the transceiving unit 1303 is further used for receiving the length information of the prefix information for performing identity allocation sent by the Home NodeB Gateway.

The allocating unit 1302 is used for implementing the allocation of UTRAN Radio Network Temporary Identities according to the information for identifying HNB-GW and the prefix information for performing identity allocation.

For example, the allocating unit 1302 is used for allocating corresponding amount of bits for the information for identifying User Equipments under the Home NodeB, according to the relationship that the sum of bits occupied by the length information of the prefix information for performing identity allocation, the length information of the information for identifying HNB-GW, and the information for identifying User Equipments under the Home NodeB is a predetermined value.

The transceiving unit 1303 is further used for sending the information for identifying UEs under the Home NodeB to the UEs.

When cell updating occurs to a user and the Home NodeB 1300 is used as a target Home NodeB, the transceiving unit 1303 is further used for receiving a cell updating message sent by the UE, and sending a cell updating message carrying the U-RNTI allocated by the source HNB to the found source HNB, when the prefix information for performing identity allocation in the U-RNTI allocated by the source HNB and the stored prefix information for adjacent cells to perform identity allocation match with each other.

For example, the transceiving unit 1303 transfers the cell updating message carrying the U-RNTI of the source HNB to the source HNB by an interface between the target HNB and source HNB.

The Home NodeB 1300 further comprises a storing unit (not illustrated in the figures) for storing the prefix information for adjacent cells to perform identity allocation.

The detecting unit 1304 is used for detecting the stored prefix information for adjacent cells to perform identity allocation, and finding the source HNB by the prefix information for performing identity allocation in the received U-RNTI allocated by the source HNB.

For example, after the target HNB receives the Cell updating message, the detecting unit 1304 obtains the U-RNTI therein allocated by the source HNB, and finds that the U-RNTI is not allocated by the present cell. When the detecting unit 1304 finds that the RNC-ID carried by the U-RNTI is same as the RNC-ID of the HNB-GW connected therewith, the determining unit 1305 may determine that the target cell is also managed by a same adjacently-connected HNB-GW simultaneously. For example, the detecting unit 1304 may compares the S-RNTI prefix in the U-RNTI allocated by the source HNB with the stored S-RNTI prefix information of adjacent cells, for example, the matching being performed from the highest bit. When one matched S-RNTI prefix information is found, it is determined that the source HNB has been found.

The transceiving unit 1303 is further used for sending the prefix information for performing identity allocation and/or the length information of the prefix information for performing identity allocation by a broadcast message.

In another embodiment of the present invention, the Home NodeB 1300 further comprises an obtaining unit (not illustrated in the figures) for obtaining the prefix information for performing identity allocation and/or the length information of the prefix information for performing identity allocation by reading broadcast messages of adjacent cells or by configuration.

From the above processes, it can be seen that the target HNB sends the source HNB the cell updating message carrying the U-RNTI allocated by the source HNB by an interface between the HNBs when cell updating is performed, which needs not the HNB-GW to forward, thereby decreases the load of processing signaling in the HNB-GW, and reduces the time delay.

Those skilled in the art may understand clearly that, for convenience and simplicity of description, corresponding processes of the aforementioned method embodiments may be referred to for specific operation processes of the above described systems, devices and units, which are not described repeatedly here.

In the several embodiments provided by the present application, it should be understood that disclosed systems, devices and methods may be implemented by other manners. For example, device embodiments described above are just indicative. For example, the division of units is just a division of logic functions, and there may be other division manners for practical implementations. For example, multiple units or components may be combined or integrated into other system, or some features may be neglected or may not be performed. At another point, the displayed or discussed mutual coupling or direct coupling or communication link may be indirect coupling or communication link through some interfaces, devices or units which may be in an electrical form, a mechanical form or other form.

The units described as separated parts may be or may not be physically separated, and the parts displayed as units may be or may not be physical units, which may be located in one place or distributed to multiple network elements. Part or all units therein may be selected to implement the target of solutions provided in the present invention according to the actual demands.

In addition, in various embodiments of the present invention, various functional units may be integrated into one processing unit, or each unit may exist separately and physically, or two or more units may be integrated into one unit. The above integrated units may be implemented in the form of hardware or may be implemented in the form of software functional unit.

When the integrated unit is implemented in the form of a software functional unit and is sold or used as an independent product, the integrated unit may be stored in a computer readable storage medium. Based on this understanding, all technical solutions of the present invention or a part that makes contributions to the prior art or all or part of the technical solutions may be essentially embodied in the form of a software product. The computer software product may be stored in a storage medium, and includes a number of instructions that enable a piece of computer equipment (may be a personal computer, a server, or a network equipment) to execute all or part of steps of the method described in various embodiments of the present invention. The preceding storage mediums comprises various mediums that can store codes, such as, a U disk, a removable hard disk, a read-only memory (ROM, Read-Only Memory), a random access memory (RAM, Random Access Memory), a magnetic disk, an optical disk, or the like.

The foregoing is only some specific embodiments of the invention without limited to the protection scope of the invention. It is easy for those skilled in the art to preconceive changes or substitutions within the technical scope disclosed by the invention, which should fall in the protection scope of the invention. Therefore, the protection scope of the present invention should be defined by that of the claims.

What is claimed is:

1. A method of allocating network temporary identities, comprising:
    obtaining capability information of a home nodeb;
    allocating prefix information for performing identity allocation to the home nodeb, according to the capability information;
    sending the allocated prefix information for performing the identity allocation to the home nodeb, so that the home nodeb implements network temporary identity allocation according to the prefix information for performing the identity allocation;
    wherein the network temporary identity comprises the prefix information for performing the identity allocation, information for identifying a home nodeb gateway and information for identifying a user equipment under the home nodeb; and
    different prefix information for performing the identity allocation corresponds to different home nodebs to implement the network temporary identity allocation.

2. The method according to claim 1, further comprising:
    allocating the prefix information for performing the identity allocation with different lengths to home nodebs with different capabilities according to the capability information.

3. The method according to claim 2, further comprising:
    sending length information of the allocated prefix information for performing the identity allocation to the home nodebs.

4. The method according to claim 2, further comprising:
    allocating, by the home nodeb, a corresponding amount of bits for the information for identifying the user equipment under the home nodeb, according to a relationship that a sum of the bits occupied by length information of the prefix information for performing the identity allocation, and length information of the information for identifying home nodeb gateway and the information for identifying the user equipment under the home nodeb is a predetermined value.

5. The method according to claim 1, further comprising:
    allocating one or multiple pieces of the prefix information for performing the identity allocation with fixed length to the home nodeb, according to the capability information.

6. The method according to claim 5, wherein the prefix information for performing the identity allocation with the fixed length is cell identity information.

7. The method according to claim 1, further comprising:
    receiving the capability information reported by the home nodeb, during one process of the group consisting of: (a) a register process of the home nodeb, (b) a configuration process of the home nodeb, and (c) a reconfiguration process of the home nodeb.

8. The method according to claim 1, further comprising:
    obtaining the capability information of the home nodeb according to configuration of a home nodeb management system (HMS) or an operation and maintenance system (OAM).

9. The method according to claim 1, wherein the capability information of the home nodeb is one of the group consisting of: (a) home nodeb type information, (b) home nodeb usage scene information, (c) the number of user equipment needed to be supported by the home nodeb, and (d) specific identity length needed by the home nodeb.

10. The method according to claim 1, wherein when cell updating occurs, the method further comprises:
    receiving, by a target home nodeb, a cell updating message sent by a user equipment, wherein the cell updating message carries UTRAN Radio Network Temporary Identity allocated by a source home nodeb;
    detecting, by the target home nodeb, stored information for adjacent cells to perform the identity allocation, and finding the source home nodeb by the information for performing the identity allocation in the received UTRAN Radio Network Temporary Identity allocated by the source home nodeb;
    sending, by the target home nodeb, the cell updating message to the found source home nodeb, wherein the cell updating message carries the UTRAN Radio Network Temporary Identity allocated by the source home nodeb.

11. The method according to claim 10, further comprising:
    comparing, by the target home nodeb, the information for performing the identity allocation in the UTRAN Radio Network Temporary Identity allocated by the source home nodeb with the information, stored in the target home nodeb, for the adjacent cells to perform the identity allocation;
    determining, by the target home nodeb, the source home nodeb has been found, when it is matched.

12. A method of allocating network temporary identities, comprising:
    receiving, by a home nodeb, prefix information for performing identity allocation, which is allocated according to capability information of the home nodeb;
    implementing, by the home nodeb, network temporary identity allocation according to the prefix information for performing the identity allocation;
    wherein the network temporary identity comprises the prefix information for performing the identity allocation information for identifying a home nodeb gateway and information for identifying a user equipment under the home nodeb; and
    different prefix information for performing the identity allocation corresponds to different home nodebs to implement the network temporary identity allocation.

13. The method according to claim 12, wherein length information of the prefix information is different when the capability information of the different home nodebs is different.

14. The method according to claim 13, further comprising:
receiving, by the home nodeb, the length information of the prefix information for performing the identity allocation.

15. The method according to claim 13, further comprising:
allocating, by the home nodeb, a corresponding amount of bits for the information for identifying user equipment under the home nodeb, according to a relationship that a sum of the bits occupied by the length information of the prefix information for performing the identity allocation, and a length information of the information for identifying home nodeb gateway and the information for identifying the user equipment under the home nodeb is a predetermined value.

16. The method according to claim 12, wherein the prefix information for performing the identity allocation is one or multiple pieces of the prefix information for performing the identity allocation with fixed length.

17. The method according to claim 16, wherein the prefix information for performing the identity allocation with the fixed length is cell identity information.

18. The method according to claim 17, further comprising:
reporting, by the home nodeb, number information of the cell identity information to the home nodeb gateway, during one process of the group consisting of: (a) a register process of the home nodeb, (b) a configuration process of the home nodeb, and (c) a reconfiguration process of the home nodeb.

19. The method according to claim 12, further comprising:
reporting, by the home nodeb, the capability information to the home nodeb gateway or a home nodeb management system, during one process of the group consisting of: (a) a register process of the home nodeb, (b) a configuration process of the home nodeb, and (c) a reconfiguration process of the home nodeb.

20. The method according to claim 17, further comprising:
broadcasting, by the home nodeb, number information of the cell identity information by a system message.

21. The method according to claim 20, further comprising:
obtaining, by the home nodeb, the number information of the cell identity information, by reading broadcast message of an adjacent home nodeb or by configuration.

22. The method according to claim 13, further comprising:
broadcasting, by the home nodeb, at least one of the prefix information for performing the identity allocation and the length information of the prefix information for performing the identity allocation, by a system message.

23. The method according to claim 22, further comprising:
obtaining, by the home nodeb, at least one of the prefix information for performing the identity allocation and the length information of the prefix information for performing the identity allocation, by reading broadcast message of an adjacent home nodeb or by configuration.

24. The method according to claim 12, further comprising:
initiating, by the home nodeb or by the home nodeb gateway, a releasing process of the information for performing the identity allocation allocated to the home nodeb, through the process of a home nodeb removing register or releasing configuration.

25. A home nodeb gateway, comprising:
a processor, configured to obtain capability information of a home nodeb; and allocate prefix information for performing identity allocation to the home nodeb according to the capability information;
a transmitter, configured to send the allocated prefix information for performing the identity allocation to the home nodeb, so that the home nodeb completes network temporary identity allocation according to the prefix information for performing the identity allocation;
wherein the network temporary identity comprises the prefix information for performing the identity allocation information for identifying the home nodeb gateway and information for identifying a user equipment under the home nodeb; and
different prefix information for performing the identity allocation corresponds to different home nodebs to implement the network temporary identity allocation.

26. The home nodeb gateway according to claim 25, wherein the processor is further configured to manage allocation of UTRAN Radio Network Temporary Identities by adopting a tree structure, according to the capability information reported by the home nodeb.

27. The home nodeb gateway according to claim 25, wherein the processor is further configured to allocate prefix information for performing the identity allocation with different lengths to the different home nodebs with different capabilities according to the capability information.

28. The home nodeb gateway according to claim 25, wherein the processor is further configured to allocate one or multiple pieces of the prefix information for performing the identity allocation with a fixed length to the home nodeb according to the capability information.

29. A home nodeb, comprising:
a transceiver, configured to report capability information of the home nodeb to a home nodeb gateway or a home nodeb management system; and receive prefix information for performing identity allocation, which is allocated according to the capability information of the home nodeb;
a processor, configured to implement network temporary identity allocation according to the prefix information for performing the identity allocation;
wherein the network temporary identity comprises the prefix information for performing the identity allocation information for identifying the home nodeb gateway and information for identifying a user equipment under the home nodeb; and
different prefix information for performing the identity allocation corresponds to different home nodebs to implement the network temporary identity allocation.

30. The home nodeb according to claim 29, wherein length information of the prefix information for performing identity allocation is different when the capability information of the different home nodebs is different.

31. The home nodeb according to claim 30, wherein the processor is further configured to allocate a corresponding amount of bits for the information for identifying user equipment under the home nodeb, according to a relationship that a sum of the bits occupied by the length information of the prefix information for performing the identity allocation, the length information of the information for identifying the home nodeb gateway, and the information for identifying the user equipment under the home nodeb is a predetermined value.

32. The home nodeb according to claim 29, wherein the prefix information for performing the identity allocation is one or multiple prefix information for performing the identity allocation with a fixed length.

33. The home nodeb according to claim 29, wherein the processor is further configured to store information for adjacent cells to perform the identity allocation; detect the stored information for adjacent cells to perform the identity allocation, and find a source nodeb by the information for performing the identity allocation in the received UTRAN Radio Network Temporary Identity allocated by a source home nodeb;

the transceiver is further configured to receive a cell updating message sent by the user equipment, and send the cell updating message carrying the UTRAN Radio Network Temporary Identity allocated by the source home nodeb to the found source nodeb when the information for performing the identity allocation in the UTRAN Radio Network Temporary Identity allocated by the source home nodeb and the stored information for the adjacent cells to perform the identity allocation match with each other, when cell updating occurs.

34. A communication system, comprising:

a home nodeb gateway or a home nodeb management system, configured to obtain capability information of a home nodeb, allocate prefix information for performing identity allocation to the home nodeb according the capability information and send the allocated prefix information for performing the identity allocation to the home nodeb;

a home nodeb, configured to implement network temporary identity allocation according to the prefix information for performing the identity allocation;

wherein the network temporary identity comprises the prefix information for performing the identity allocation information for identifying the home nodeb gateway and information for identifying a user equipment under the home nodeb; and different prefix information for performing the identity allocation corresponds to different home nodebs to implement the network temporary identity allocation.

* * * * *